United States Patent [19]

McMaster et al.

[11] 4,204,854
[45] May 27, 1980

[54] APPARATUS AND METHOD FOR BENDING GLASS SHEETS

[76] Inventors: Harold A. McMaster, 420 Water St., Woodville, Ohio 43469; John S. Nitschke, 324 E. Second, Perrysburg, Ohio 43551; Dean M. Nitschke, 512 W. Broadway, Maumee, Ohio 43537

[21] Appl. No.: 968,230

[22] Filed: Dec. 11, 1978

Related U.S. Application Data

[63] Continuation-in-part of Ser. No. 901,533, May 1, 1978, abandoned.

[51] Int. Cl.² ............................................ C03B 23/02
[52] U.S. Cl. ...................................... 65/106; 65/104; 65/273; 65/285; 65/287
[58] Field of Search .................. 65/104, 106, 107, 273, 65/285, 287

[56] References Cited

U.S. PATENT DOCUMENTS 3,607,200  9/1971  McMaster ......................... 65/182 A Primary Examiner—Arthur D. Kellogg
Attorney, Agent, or Firm—Reising, Ethington, Barnard, Perry & Brooks

[57] ABSTRACT

Apparatus and a method disclosed for use in bending heated sheets of glass (G) transported generally horizontally on a conveyor (16) within a furnace heating chamber incorporate a holder (20) located above the conveyor in a spaced relationship such that a heated sheet of glass can be transported under the holder. Gas such as air is blown upwardly from below the conveyor against the heated sheet of glass such that the sheet is moved upwardly into engagement with the holder. The upwardly blown gas is provided by an array of gas jet pumps (60) positioned below the conveyor. A mold ring (44) is then movable under the holder to receive the glass sheet for bending. Holder (20) is disclosed as including curved and planar surfaces and as including curved and planar rings. A vacuum may be drawn with the holder embodiments having the surfaces so as to assist the upwardly blown gas in lifting the sheet of glass off the conveyor. Vertical movement of the holder facilitates the lifting and also enables the curved surface and curved ring embodiments of the holder to bend the lifted glass sheet between the holder and the mold ring. Gravity bending on the mold ring forms the glass on the planar surface and planar ring embodiments of the holder and can also be used with the curved surface and ring embodiments of the holder. Movement of the mold ring to a quench station after the bending tempers the glass.

24 Claims, 9 Drawing Figures

APPARATUS AND METHOD FOR BENDING GLASS SHEETS

CROSS REFERENCE TO RELATION APPLICATION

This application is a continuation-in-part of an application of Harold A. McMaster et al, U.S. Ser. No. 901,533, filed May 1, 1978, now abandoned the entire disclosure of which is hereby incorporated by reference.

TECHNICAL FIELD

This invention relates to apparatus and a method for bending heated sheets of glass in a manner that is particularly adaptable for use prior to quenching of the bent sheet of glass so as to thereby provide tempering of the glass in order to increase its mechanical strength.

BACKGROUND ART

Bent and tempered glass is used extensively for vehicle side and rear windows to provide good resistance to breakage as well as an aesthetically appealing shape that complements the design of the vehicle. In order to perform the bending and tempering, sheet glass must be heated to its deformation point of about 1200° to 1300° F. and then bent to the required shape before being rapidly cooled by an air spray in order to temper the glass. Tempering greatly increases the mechanical strength of the glass and its resistance to breakage as well as causing the glass to break into small relatively dull pieces when broken instead of into large sharp slivers as is the case with the untempered glass.

One manner in which glass is bent and tempered is with press benders having shaped surfaces between which heated glass is clamped to shape it prior to being air cooled by a quench unit to provide tempering. U.S. Pat. Nos. 3,454,389; 3,476,542; 3,488,178; 3,600,150; and 3,951,634 disclose press bending and tempering apparatus for sheet glass.

Sheet glass is also bent and tempered by heating of planar glass sheets while supported on bending molds including movable sections. Prior to softening of the glass during heating, the sections of the mold are oriented to accommodate for the glass sheet planarity. Upon softening of the glass sheet as it is heated, the mold sections move relative to each other under the force of gravity acting on the sheet and the mold sections in order to provide bending of the sheet prior to rapid cooling thereof which provides its tempering. Thin glass, i.e. on the order of ⅛", cannot be bent by this apparatus since it does not become hot enough to temper until the glass becomes so soft that it overbends. U.S. Pat. Nos. 3,269,822; 3,278,287; 3,307,930; and 3,365,285 disclose this type of bending and tempering apparatus.

Heating of glass sheets prior to bending and tempering thereof has also been performed on fluid support beds as the glass is conveyed through a furnace. Normally the support bed is inclined slightly with respect to the horizontal so that gravity engages an edge of the glass with a movable frame that provides the impetus for glass movement along the bed. The fluid support from below the glass is sufficient to avoid contact between the bed and the lower surface of the glass during conveyance of the glass as it is heated and softened, but is otherwise insufficient to provide controlled vertical displacement of the glass, as the shape of the apertures in the support bed and the normal operating pressure typically provide only nominal support of the glass above the support bed of about one-eighth inch. This lack of contact prevents marring and scratching of the soft surfaces of the glass as the glass reaches its deformation temperature. U.S. Pat. Nos. 3,497,340; 3,607,187; and 3,607,200 disclose glass bending and tempering apparatus of this type with a fluid support bed.

Vacuum forming of heated glass sheets is disclosed by U.S. Pat. No. 3,778,244 wherein the sheet glass is first heated during conveyance along a roller hearth conveyor. After heating, a lifter with a curved downwardly facing surface has a vacuum applied thereto about the surface to shape the glass. After shaping against the curved surface of the lifter, the vacuum is terminated to drop the glass onto a mold for conveyance to a waiting operator who removes the glass from the mold. Further vacuum forming of the glass to a curved surface of the mold is also disclosed.

Other bending and tempering apparatus for sheet glass is disclosed by U.S. Pat. Nos. 2,223,124; 2,348,887; 2,646,647; and 2,085,520.

It is also known to heat sheet glass by conveyance thereof on a roller hearth conveyor that extends through a heating chamber of a furnace. The glass is supported on elongated rolls or rollers of the conveyor in a horizontally extending orientation. Opposite ends of the rollers are frictionally driven by continuous drive loops in the form of belts or chains in order to provide the glass movement. See U.S. Pat. Nos. 3,806,312; 3,934,970; 3,947,242; and 3,994,711.

DISCLOSURE OF THE INVENTION

An object of the present invention is to provide improved apparatus and an improved method for bending heated sheets of glass transported generally horizontally on a conveyor. The glass bending apparatus and method is particularly adaptable for use in bending heated sheets of glass prior to quenching of the glass to provide tempering thereof but can also be utilized to bend glass which is then annealed.

In carrying out the above object and other objects of the invention, the apparatus is located within a heating chamber of a furnace that heats the glass and includes a holder located above the conveyor in a spaced relationship such that a heated sheet of glass can be transported below the holder. Gas such as air is then blown upwardly from below the conveyor against the heated sheet of glass such that the sheet is moved upwardly into engagement with the holder. A mold preferably in the form of a ring is then moved under the holder to receive the sheet of glass for bending.

Embodiments of the holder disclosed include a curved surface, a generally planar surface, a curved ring, and a generally planar ring. A vacuum may be drawn with the holder embodiments having the surfaces so as to assist the upwardly blown gas in lifting the sheet of glass off the conveyor. Vertical movement of the holder downwardly prior to the lifting facilitates the lifting of the glass into engagement with the holder and subsequent upward movement of the holder then allows the mold ring to move under the holder to receive the sheet of glass for bending.

All of the holder embodiments disclosed are capable of bending the lifted sheet of glass by dropping it onto the mold ring for sag bending under the influence of gravity. The holder embodiments including the curved surface and the curved ring are also operable to bend the heated sheet of glass between the holder and the mold ring. With the sheet of glass lifted on the holder, relative vertical movement between the holder and the mold ring provides the bending of the glass therebetween. The relative vertical movement between the holder and the mold ring is preferably provided by the same vertical holder movement that is used in the initial glass pickup; but, it is also possible to move the mold upwardly to provide this bending. Upon the initial pickup of the glass by the holders having the curved surface and the curved ring, the sheet of glass may be partially or fully formed to the curved shape of the holder by the upwardly blown gas. A first portion of the sheet of glass is engaged with the holder when the sheet is only partially formed and at least one second portion thereof is then prevented from drooping downwardly by the upwardly blown gas and may also be prevented from drooping downwardly by the vacuum which is applied to the curved surface embodiment of the holder. Subsequent sag bending of the sheet of glass on the mold ring allows forming thereof to the required curvature which may be the same as or greater than the curvature of the curved holder embodiments.

A plenum or other suitable means is located below rolls of the conveyors to blow the gas upwardly against the heated sheet of glass that is lifted upwardly against the holder. Pressurized gas such as heated air in the furnace heating chamber is supplied to the plenum. The pressurized gas is forced from the plenum through an array of gas jet pumps which amplify the flow to provide fluid pressure on the underside of the glass sheet in an amount sufficient to lift it above the conveyor into engagement with the holder. The upwardly blown gas cooperates with the holder embodiments having the surfaces at which a vacuum is drawn in order to provide the lifting of the sheet of glass off the conveyor into engagement with the holder. The vacuum drawn at the holder surface is at a controlled degree which can be decreased after pickup to prevent deformation of the lifted sheet of glass at spaced openings in the surface through which the vacuum is drawn. Gas under slight pressure can also be supplied to the holder to blow the lifted sheet of glass downwardly away from the holder onto the mold ring.

The objects, features, and advantages of the present invention are readily apparent from the following detailed description of the preferred modes thereof when taken in connection with the accompanying drawings.

BEST MODE FOR CARRYING OUT THE INVENTION

Figure 1:
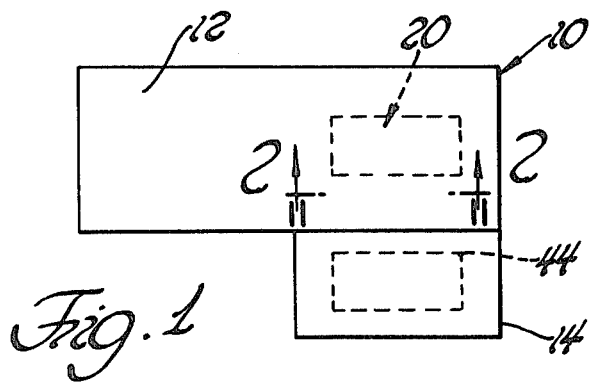
FIG. 1 is a schematic top plan view of a glass tempering system that includes bending apparatus constructed according to the present invention.

Referring to FIG. 1 of the drawings, a glass bending and tempering system indicated generally by 10 incorporates apparatus constructed according to the present invention and includes a furnace 12 having a heating chamber for heating sheets of glass and also includes a quench station 14 for rapidly cooling the glass to provide tempering thereof after a bending operation has first been performed in a manner which is hereinafter described. Furnace 12 includes a roller hearth conveyor shown in FIG. 2 and indicated by reference numeral 16. Rollers or rolls 18 of the conveyor transport sheets of glass G in a horizontal orientation for heating within the heating chamber of the furnace.

Figure 2:
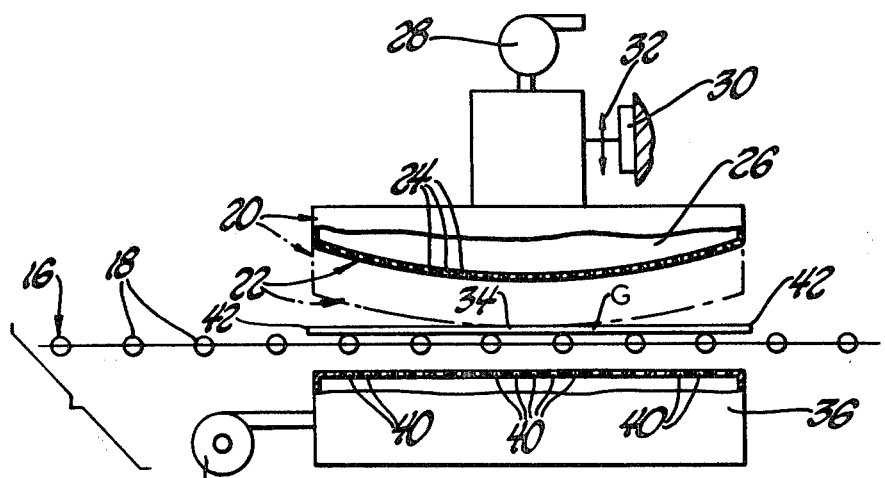
FIG. 2 is an elevation view taken along line 2—2 of FIG. 1 and shows the glass bending apparatus.
Figure 3:
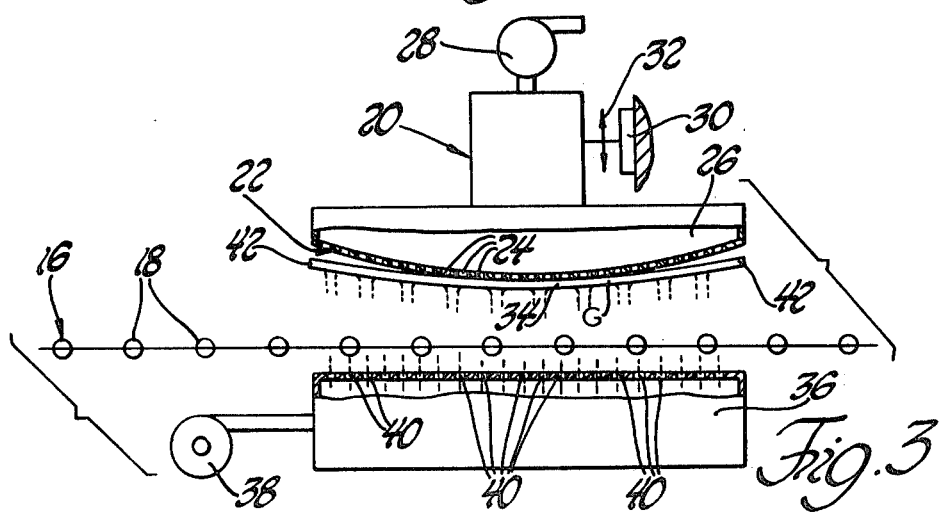
FIG. 3 is a view similar to FIG. 2 but shows the apparatus after a heated sheet of glass has been lifted upwardly off a conveyor by a vacuum holder into engagement with a lower curved surface thereof.

Apparatus constructed according to this invention is shown in FIG. 2 as including a holder 20 which has a lower curved surface 22 of a downwardly convex shape. Openings 24 in surface 22 communicate with a plenum 26 of the holder in which a vacuum may be drawn by a blower unit 28. An actuator 30 mounts the holder 20 for vertical movement upwardly and downwardly as shown by arrows 32. Downward movement of the holder 20 to the phantom line indicated position of FIG. 2 positions the holder surface 22 in proximity to the heated sheet of glass G which is transported under the holder. The central portion 34 of the glass sheet is located closest to the holder surface 22. A fixed plenum 36 mounted within the furnace heating chamber below the conveyor 16 is supplied positive gage pressure gas, such as heated air in the heating chamber, by a blower 38. Jet openings 40 in the upper side of the plenum allow the pressurized gas to escape and to be blown upwardly against the sheet of glass. The upwardly blown air lifts the glass into engagement with the lower surface 22 of the holder. As seen in FIG. 3, holder 20 is subsequently moved upwardly and the upwardly blown gas prevents the glass sheet ends 42 from drooping downwardly relative to the central portion 34. Preferably, the upwardly blown glass bends the ends 42 upwardly toward the curved shape of the lower holder surface 22. The vacuum which may be drawn within the holder surface openings 24 assists the upwardly blown gas in lifting the glass sheet and preventing drooping of its ends and also assists in bending the ends upwardly.

Figure 4:
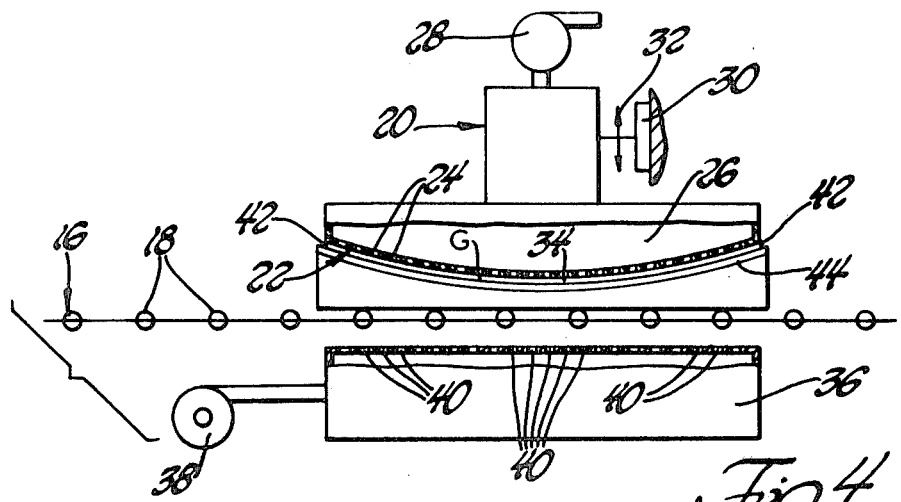
FIG. 4 is a view similar to FIG. 3 but at a subsequent stage of operation according to one mode of operation wherein the heated sheet of glass is bent between the holder and a mold of the apparatus.

A curved mold 44 is then moved under the holder 20 as shown in FIG. 4 and the holder is moved downwardly in accordance with one mode of operation toward the mold so that the sheet of glass G is bent between the mold and the holder surface 22. Ends 42 of the sheet of glass are bent farther in an upward direction relative to the central glass portion 34 by the consequent forming which takes place. It should be noted that the mold 44 preferably takes the form of a ring having an open center and a shape that corresponds to the periphery of the sheet of glass. A helical spring may be wrapped around the mold ring 44 in order to reduce the surface contact with the heated sheet of glass to prevent cracking of the glass. After the bending, the vacuum holder 20 is moved upwardly and the mold ring 44 is moved to the quench station 14 in any suitable manner so that cooling of the sheet of glass in its bent shape provides tempering thereof which increases the mechanical strength of the glass.

Figure 5:
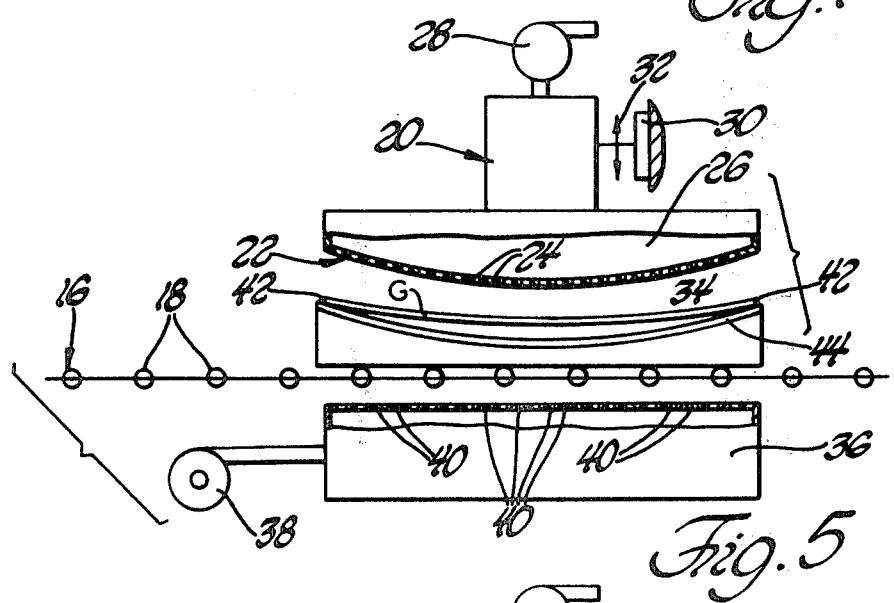
FIG. 5 is another view similar to FIG. 3 which shows the operation according to another mode of operation wherein the sheet of glass is dropped downwardly for sag bending under gravity on the mold.
Figure 6:
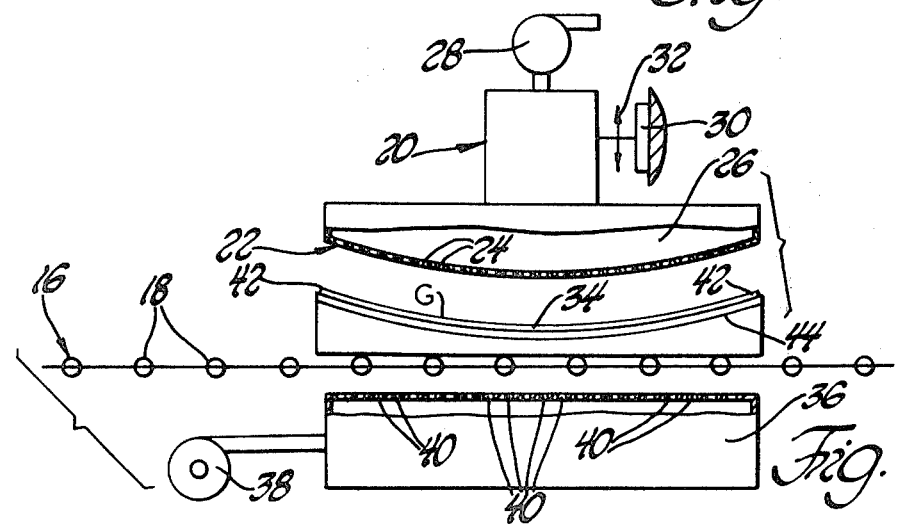
FIG. 6 is a view similar to FIG. 5 which shows the apparatus after the gravity sag bending on the mold is completed.

Another mode of operation of the apparatus is shown in FIG. 5 wherein the partially bent sheet of glass G is dropped downwardly by termination of the gas blown upwardly by the plenum 36 and termination of any vacuum drawn at the surface openings 24. Gravity then causes the sheet of glass G to sag to the shape of the mold ring 44. Ends 42 of the sheet of glass are thus effectively bent upwardly by the downward sagging of the central portion 34. Subsequently, the mold ring 44 is moved to the quench station 14 shown in FIG. 1 for tempering.

It should be noted that the blower unit 28 may be operable to draw the vacuum at a controlled rate that can be decreased after pickup to prevent deformation of the lifted sheet of glass at the openings 24 in the holder surface 22. Blower unit 28 can also supply positive gage pressure air to the holder plenum 26 in order to blow the sheet of glass G downwardly away from the holder surface 22.

Figure 7:
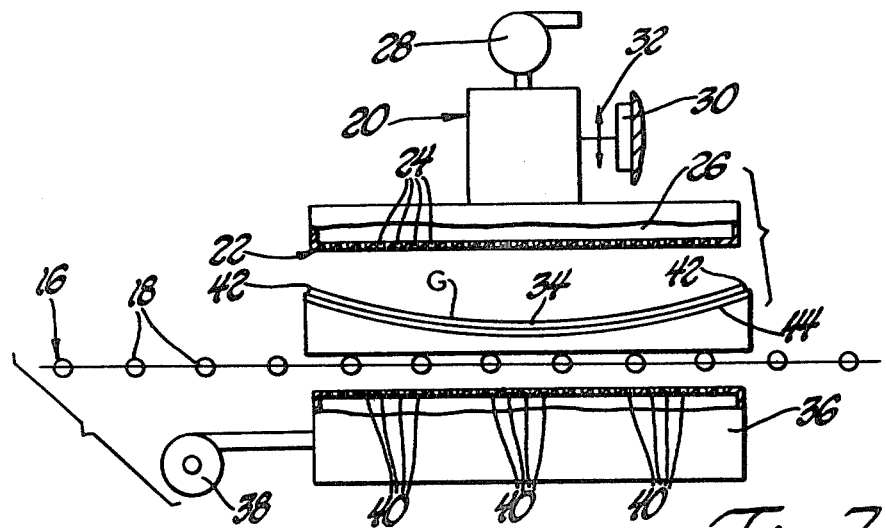
FIG. 7 is a view similar to FIG. 6 of another embodiment of the vacuum holder which has a generally planar lower surface.

Another embodiment of the apparatus is shown in FIG. 7 and the components thereof are the same as those of the previously described embodiments, except as will be noted, such that like reference numerals are applied thereto and much of the previous description is applicable. However, the lower surface 22 of the holder 20 in this embodiment is generally planar so that the full surface of the sheet glass G is engaged with the holder surface upon glass pickup. The holder is movable downwardly to facilitate the pickup by the upwardly blown gas from the lower plenum 36 and, if required, the vacuum assist provided by the vacuum which may be drawn at the openings 24 through the planar surface. After upward movement, the glass is dropped onto the mold ring 44 for sag bending under the force of gravity. It is not possible to form the glass between the surfaces of the holder and the mold due to the planar condition of the holder surface in this embodiment.

Figure 8:
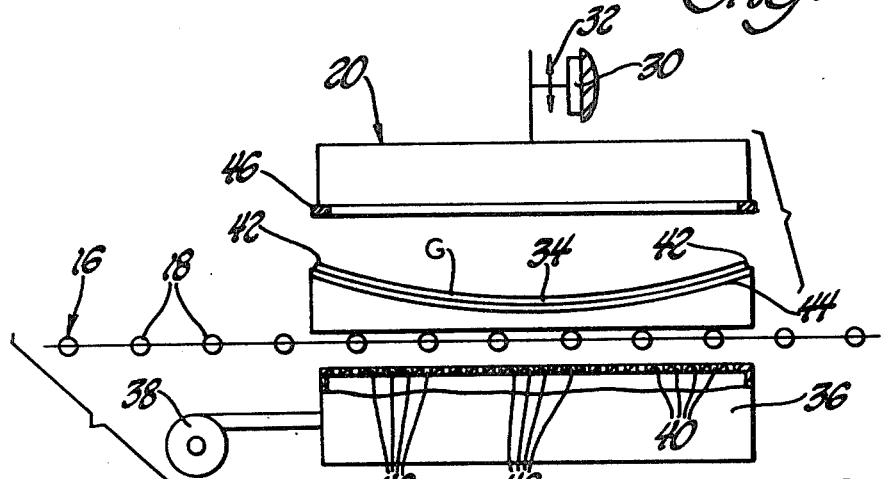
FIG. 8 is a view similar to FIG. 6 of another embodiment of the holder which includes a generally planar ring.

A further embodiment of the apparatus is shown in FIG. 8 and is also identified by the same reference numerals as the previously described embodiments, except as will be noted. The holder 20 of this embodiment includes a ring 46 that has a planar shape and conforms to the periphery of the sheet of glass to be bent. Downward movement of the holder ring 46 prior to positioning of the mold ring 44 thereunder facilitates the proper positioning of the sheet of glass as it is blown upwardly by the plenum air so that its periphery engages the holder ring. Subsequent movement of the mold ring 44 under the holder carrying the lifted sheet of glass and termination of the upwardly blown air then allows the glass to drop downwardly onto the mold ring for sag bending under the influence of gravity. It is not possible to form the sheet of glass between the mold and holder rings 44 and 46 due to the planar shape of the holder ring.

Figure 9:
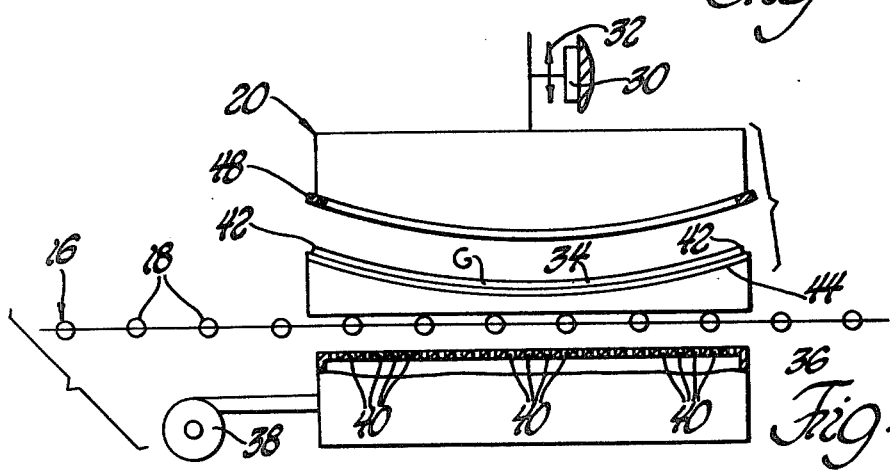
FIG. 9 is a view similar to FIG. 6 of another embodiment of the holder which includes a curved ring.

Another embodiment of the apparatus is shown in FIG. 9 and identified by the same reference numerals as the previously described embodiments except as will be noted. The holder 20 of this embodiment includes a curved ring 48 against which the upwardly blown gas lifts the sheet of glass G into engagement so as to allow the holder to move upwardly and then permit the mold ring 44 to move under the holder. This embodiment can operate by dropping the sheet of glass upon termination of the upwardly blown air so that the glass sags under the bias of gravity or it can operate by moving the holder downwardly as the air continues to be blown upwardly such that the sheet of glass G is bent between the mold ring 44 and the holder ring 48.

Figure 10:
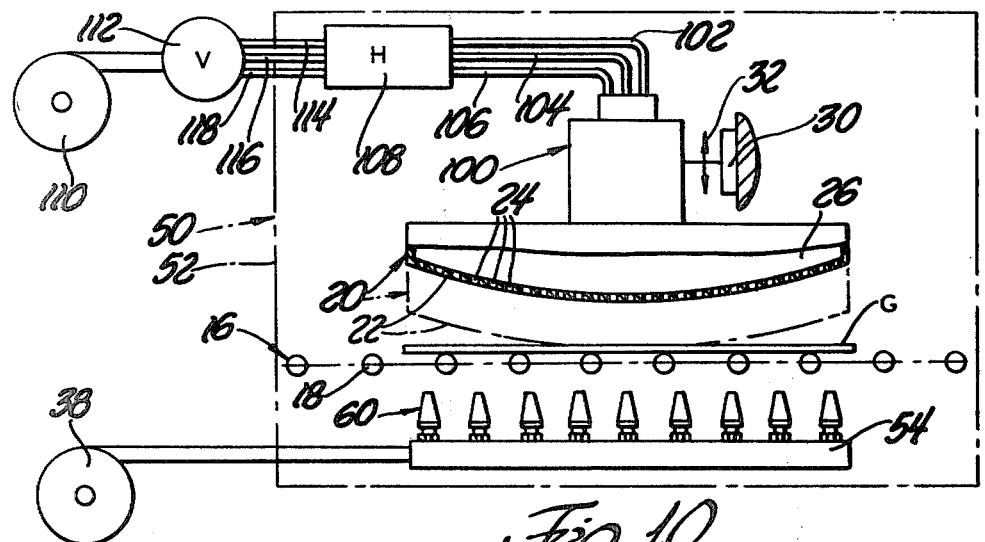
FIG. 10 is a view similar to FIG. 2 in which a first type of gas jet pump is used to provide positive and vacuum pressures in the holder and a second type of gas jet pump is used to provide positive pressure on a glass sheet from below.
Figure 11:
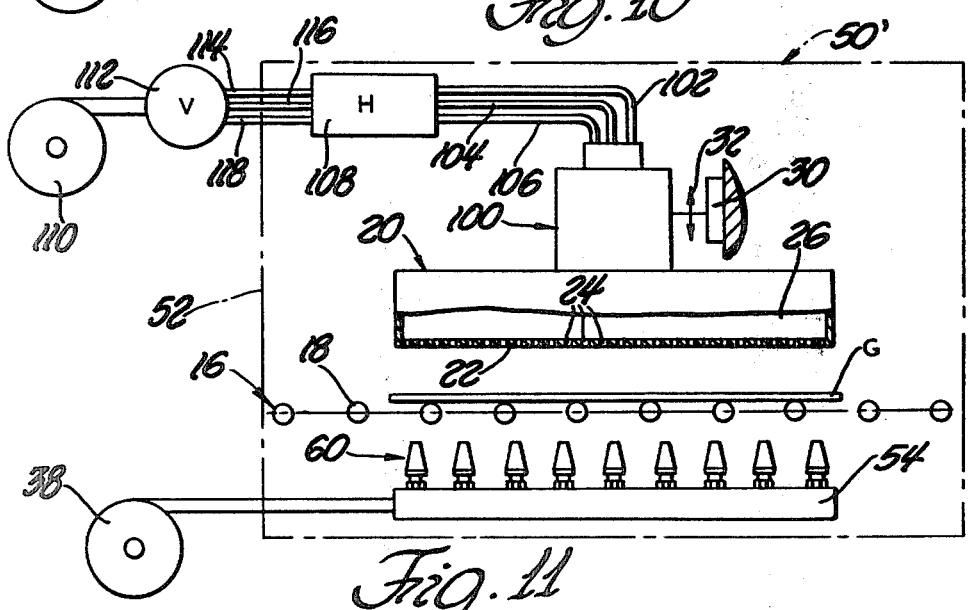
FIG. 11 is a view similar to FIG. 10 in which the holder has a flat surface instead of convex.

Still another two types of apparatus constructed according to this invention are shown in FIGS. 10 and 11. As a preface to a description of these apparatus, it is to be noted that like reference numerals will be used wherever portions of these apparatus correspond to similar portions of previously described apparatus.

With reference to FIG. 10, a glass bending system is indicated generally at 50. The system 50 includes an enclosed heating chamber 52. A sheet of glass G is conveyed into the chamber 52 on a conveyor, generally at 16, defined by a set of spaced, horizontally extending rollers 18. A holder 20 is located within the chamber 52 and is provided to move the glass sheet G through the range of vertical positions indicated by the solid and phantom lines. The relative vertical movement of the holder 20 is effected through an externally controlled actuator 30 which permits controlled movement of the holder in the direction of the arrows 32.

In this embodiment, the holder 20 has a curved lower surface 22. When the holder 20 is at its lower most extreme of vertical travel, the center of the lower surface will be proximate the glass sheet G.

The lower surface 22 has formed in it a plurality of spaced apertures 24 which permit the development of vacuum pressure and positive gage pressure on the upper surface of the glass sheet G. Vacuum pressure is created by drawing of air through the apertures 24 into a plenum 26, and positive pressure can be developed by forcing air from the plenum 26 downwardly through the apertures 24.

The glass sheet G can be raised from below by the application of positive gage pressure from a set of spaced gas jet pumps, indicated generally at 60, mounted on a plenum 54 which is supplied with air by a blower 38. The gas jet pumps 60 are one of two types of such pumps used herein, and will be described presently.

Figure 12:
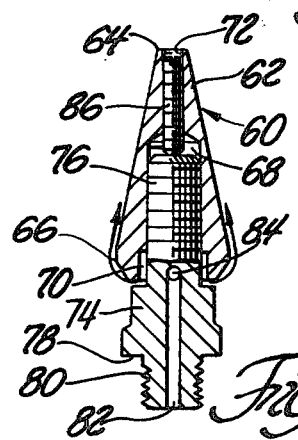
FIG. 12 is one embodiment of the second type of gas jet pump used in the apparatus of FIGS. 10 and 11.

With reference to FIG. 12, each of the gas jet pumps 60 includes a generally conical-shaped head section 62. The head section 62 has a truncated top 64 and an inwardly rounded lower shoulder 66. A first tapped bore 68 is formed from the bottom of the head section 62 along its longitudinal axis. A counterbore 70 is formed concentrically with the first tapped bore 68. A second tapped bore 72 is formed through the top of the head section 62 along its longitudinal axis in concentricity with the first tapped bore 68. A body section 74 includes an upper threaded stem 76 which is received in threaded engagement with the first tapped bore 68. The body section 74 has a lower shoulder 78 which steps down to a threaded male connector 80. A central axial bore 82 is formed through the body section 74 to the start of the threaded stem 76. The axial bore 82 is communicated by a radial bore 84 to the annular volume defined by the counterbore 70. A lockscrew 86 having a screwdriver slot or the like is threaded into the second threaded bore 72 and engaged with the upper surface of the stem 76 to secure the head section 72 against relative vertical movement. Lockscrew 86 permits adjustment of the spacing between the lower end of the head section 62 and the body section 74 by loosening of the lockscrew and threading of the head section 62 on stem 76 prior to subsequent tightening of the lockscrew. Such adjustment controls the extent of primary air flow through the jet pump 60 and hence the extent of the gas jet flow that lifts the sheet of glass up off the conveyor 16 as is hereinafter described.

In the operation of the jet pump 60, when air or other gas from a high pressure source is admitted through the axial bore 82 it travels upwardly and then laterally out the radial bore 84 into the volume defined by the counterbore 70. The compressed air then escapes from the jet pump 60 in a thin film along the direction indicated by the arrows and flows upwardly along the outer surface of the head section 62 about its entire circumference. The outward flow entrains a secondary flow of heated gas within the heating chamber 52 for movement in an upward direction along the surface of the conical head section 62.

Figure 13:
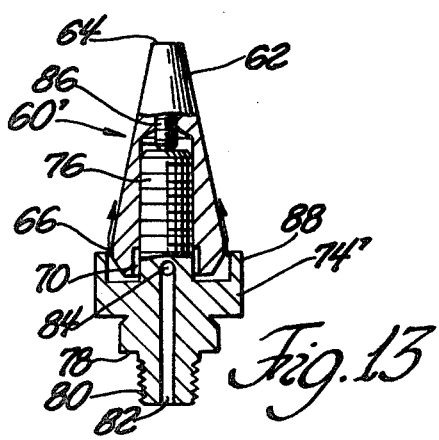
FIG. 13 is another, slightly modified, embodiment of the second type of gas jet pump.

A slightly modified embodiment of the gas jet pump just described is shown generally at 60' in FIG. 13. Again, wherever correspondence exists between like portions of the gas jet pumps 60 and 60', like reference numerals will be used to identify those corresponding portions. The gas jet pump 60' has a substantially enlarged body section 74' which has formed integrally with it a circumferential collar 88. The collar 88 surrounds the lower shoulder 66 of the head section 62, and is provided to facilitate upward deflection of air escaping from the radial bore 84 through the volume defined by the counterbore 70. Heated gas within the heating chamber 52 is entrained by the primary gas flow and flows upwardly therewith to lift the sheet off of the conveyor 16.

With both jet pumps 60 and 60' the secondary flow of heated gas is much greater than the primary flow of cooler gas from the blower 38 such that the temperature of the combined upward gas flow is great enough so as not to appreciably cool the glass that is lifted. Such jet pump apparatus allows the blower 38 to blow more dense cooler air rather than blowing less dense hotter air received from the heating chamber. Blowing the hotter air back to the heating chamber into a plenum with jet openings would prevent chilling of the glass but would result in inefficiencies in moving the air. Likewise, subjecting the moving parts of the blower to heated air could also cause problems. Also, the gas jet pumps 60 and 60' can be used with each of the other holder embodiments previsously described (i.e. the ring holders as well as the vacuum holders) and still function during the glass bending operation.

Referring again to FIG. 10, vacuum pressure and positive pressure is developed in the plenum 26 by means of a gas jet pump 100. This is the second type of gas jet pump used herein, and it is described in full detail in the application of Harold A. McMaster et al, U.S. Ser. No. 968,232 filed concurrently herewith, and whose entire disclosure is incorporated herein by reference. However, a brief description of the operation of the second type of gas jet pump 100 will be given to provide an understanding of its use in the apparatus of FIG. 10.

The gas jet pump 100 is supplied with primary air from a pressurized source by supply lines 102, 104 and 106. These supply lines carry primary air flows which can be selected to create high or low vacuums or positive pressure within the plenum 26. Specifically, the supply line 102 can be selected for positive pressure, and one or both of the supply lines 104 and 106 can be selected for low or high vacuums. The primary flow through a supply line is used in the gas jet pump 100 to create an amplified secondary flow therethrough. An upward secondary flow through the gas jet pump will create a vacuum in the plenum 26 to lift the sheet of glass off the conveyor 16. Thereafter, reducing the extent of vacuum drawn prevents the lifted sheet of glass from being deformed at the openings 24. Subsequently after termination of the vacuum, a downward secondary flow of heated gas from the heating chamber into the plenum 26 will create positive pressure that aids in quick releasing the glass under the influence of gravity. In both modes of operation the secondary flow is much greater than the primary flow so as not to substantially reduce the temperature of the heating chamber or chill the glass upon the quick releasing.

The high pressure source may be a blower or a compressor unit 110. The output of the blower 110 is provided to a valve 112 which can be set to select which of its three output lines 114, 116 and 118 will carry a primary flow. The output lines 114, 116 and 118 are received by a heat exchanger 108 located within the enclosed heating chamber 52. The heat exchanger 108 is provided to maintain temperature stability of the glass sheet G, as normal operating temperatures in the enclosed heating chamber 52 may be 1200–1300° F. The outputs from the heating unit 108 are the supply lines 102, 104 and 106.

A somewhat modified form of glass bending system from that previously described is shown generally at 50'. The glass bending system 50' uses a holder 20 with a planar lower surface 22, instead of a convex surface. In all other respects the system 50' is similar to the system 50 just described. In this regard, the gas jet pump 100 and related apparatus have equal applicability in a system employing a holder 20 with a planar surface 22. However, the curved surface provides prebending of the glass in order to permit a later greater bending on a ring mold in the manner previously described. Planar surface 22 can be used to lift glass of any size for subsequent gravity bending on a ring mold of any shape and, as such, has great production flexibility.

Those skilled in the art will recognize that various other apparatus and methods for practicing the present invention are possible in addition to the preferred modes which have herein been described in detail and such other apparatus and methods are defined by the following claims.

What is claimed is:

1. Apparatus for use in bending heated sheets of glass transported generally horizontally on rolls of a roller conveyor within a heating chamber, the apparatus comprising: a glass sheet holder located above the rolls of the roller conveyor in spaced relationship thereto such that a sheet of glass can be transported under the holder by the conveyor; actuable means for supplying pressurized gas, said actuable means including outlet openings located below the rolls of the conveyor so as to blow gas upwardly therebetween against the sheet of glass below the holder after movement thereunder with a sufficient pressure such that the sheet of glass is lifted upwardly into engagement with the holder so as to be spaced above the conveyor; and a curved mold movable under the holder to receive the sheet of glass therefrom.

2. Apparatus as in claim 1 wherein the holder includes a downwardly facing surface that is engaged by the sheet of glass which is lifted upwardly from the conveyor.

3. Apparatus as in claim 2 wherein the surface of the holder is generally planar.

4. Apparatus in claim 2 wherein the surface of the holder is curved.

5. Apparatus as in claims 3 or 4 further including means for drawing a vacuum at the surface of the holder so as to assist the actuable means for supplying pressurized gas in lifting a sheet of glass upwardly off the conveyor.

6. Apparatus as in claim 1 wherein the holder comprises a ring that is engaged by the periphery of the sheet of glass that is lifted upwardly from the conveyor.

7. Apparatus as in claim 6 wherein the ring has a planar shape.

8. Apparatus as in claim 6 wherein the ring has a curved shape.

9. Apparatus for use in bending heated sheets of glass transported generally horizontally on a conveyor, the apparatus comprising: a vacuum holder located above the conveyor and having a lower curved surface at which a vacuum is drawn to lift a first portion of a heated sheet of glass upwardly from the conveyor into engagement with the holder surface; and a plurality of gas jet pumps positioned below the conveyor, each of said gas jet pumps being adapted to receive a primary inflow of gas and produce an amplified secondary outflow of gas which blows upwardly against the sheet of glass such that a second portion thereof is prevented from drooping downwardly relative to the first portion thereof.

10. Apparatus for bending heated sheets of glass transported generally horizontally on a conveyor, the apparatus comprising: a vacuum holder located above the conveyor and having a lower curved surface at which a vacuum is drawn to lift a portion of a heated sheet of glass upwardly from the conveyor into engagement with the holder surface; a plurality of gas jet pumps positioned below the conveyor, each of said gas jet pumps being adapted to receive a primary inflow of gas and produce an amplified secondary outflow of gas which blows upwardly against the sheet of glass such that a second portion thereof is prevented from drooping downwardly relative to the first portion thereof; and a curved mold movable under the holder to receive the lifted sheet of glass for bending thereof.

11. Apparatus as in claim 10 further including a mounting means that supports the vacuum holder for vertical movement between a lower position where glass sheet pickup from the conveyor is facilitated and an upper position where the mold can readily move under the holder.

12. Apparatus for bending heated sheets of glass transported generally horizontally on a conveyor, the apparatus comprising: a vacuum holder located above the conveyor and having a lower curved surface at which a vacuum is drawn to lift a first portion of a heated sheet of glass upwardly from the conveyor into engagement with the holder surface, a plurality of gas jet pumps positioned below the conveyor, each of said gas jet pumps being adapted to receive a primary inflow of gas and produce an amplified secondary outflow of gas which blows upwardly against at least one second portion of the sheet of glass such that the second portion thereof is prevented from drooping downwardly from the first portion thereof; a curved mold movable under the holder; and means for providing relative vertical movement between the holder and the mold in order to bend the sheet of glass therebetween.

13. Apparatus as in claim 12 wherein the means for moving the holder and mold vertically relative to each other includes a mounting means that supports the vacuum holder for vertical movement.

14. Apparatus for bending heated sheets of glass transported generally horizontally on a conveyor, the apparatus comprising: a vacuum holder located above the conveyor and having a lower curved surface of a downwardly convex shape at which a vacuum is drawn to lift a central portion of a heated sheet of glass upwardly from the conveyor into engagement with the holder surface; a plurality of gas jet pumps positioned below the conveyor, each of said gas jet pumps being adapted to receive a primary inflow of gas and produce an amplified secondary outflow of gas which blows upwardly against ends of the sheet of glass on opposite sides of the central portion thereof such that the ends are bent upwardly from the central portion; and a curved mold movable under the holder to receive the lifted sheet of glass upon termination of the holder vacuum and the upwardly blown gas such that the central portion thereof sags downwardly relative to the ends thereof on the mold in order to complete the bending of the sheet of glass.

15. Apparatus for use in bending heated sheets of glass transported generally horizontally on a conveyor within a heating chamber, the apparatus comprising: a holder including a ring located above the conveyor in spaced relationship thereto such that a sheet of glass can be transported under the holder by the conveyor; a plurality of gas jet pumps positioned below the conveyor, each of said gas jet pumps being adapted to receive a primary inflow of gas and produce an amplified secondary outflow of gas which blows upwardly against the sheet of glass below the holder such that the sheet of glass is lifted upwardly to engage the periphery thereof with the holder ring; and a curved mold movable under the holder ring to receive the sheet of glass from the holder ring for bending thereof.

16. Apparatus as in claim 15 wherein the holder ring has a curved shape.

17. Apparatus as in claims 15 or 16 further including means for providing relative vertical movement between the holder ring and the mold to form the sheet of glass therebetween.

18. Apparatus for use in bending heated sheets of glass transported generally horizontally on a conveyor within a heating chamber, the apparatus comprising: a holder including a generally planar surface located above the conveyor in spaced relationship thereto such that a sheet of glass can be transported under the holder by the conveyor; a plurality of gas jet pumps positioned below the conveyor, each of said gas jet pumps being adapted to receive a primary inflow of gas and produce an amplified secondary outflow of gas which blows upwardly against the sheet of glass below the holder such that the sheet of glass is lifted upwardly into engagement with the planar surface of the holder; and a curved mold movable under the holder surface to receive the sheet of glass therefrom for bending.

19. Apparatus as in claim 18 further including means for drawing a vacuum at the planar surface.

20. Apparatus as in claims 1, 2, 3, 4, 6, 7, 8, 9, 10, 11, 12, 13, 14, 15, 16, 18, or 19 further including a quench station to which the bent sheet of glass is moved for tempering thereof.

21. A method for bending heated sheets of glass transported horizontally on a conveyor, the method comprising:

conveying a heated sheet of glass below a holder spaced above the conveyor;

blowing gas upwardly from below the conveyor against the sheet of glass such that the glass is engaged with the holder; and moving a curved mold under the holder so as to receive the sheet of glass.

22. A method as in claim 21 wherein a vacuum is drawn at a downwardly facing surface of the holder so as to cooperate with the upwardly blown gas in lifting and supporting the sheet of glass against the holder.

23. A method as in claim 21 wherein vertical movement between the mold and the holder forms the sheet of glass between the curved mold and a curved surface of the holder.

24. A method as in claims 21, 22, or 23 wherein the sheet of glass is tempered after bending thereof.

* * * * *

UNITED STATES PATENT AND TRADEMARK OFFICE
CERTIFICATE OF CORRECTION

PATENT NO. : 4,204,854

DATED : May 27, 1980

INVENTOR(S) : Harold A. McMaster et al

It is certified that error appears in the above—identified patent and that said Letters Patent is hereby corrected as shown below:

Column 7, line 47 after "sheet" insert --of glass--

Column 9, line 52 (Claim 10, line 14), after "lift a" insert --first--

Signed and Sealed this

Nineteenth Day of August 1980

[SEAL]

Attest:

SIDNEY A. DIAMOND

Attesting Officer

Commissioner of Patents and Trademarks